UNITED STATES PATENT OFFICE.

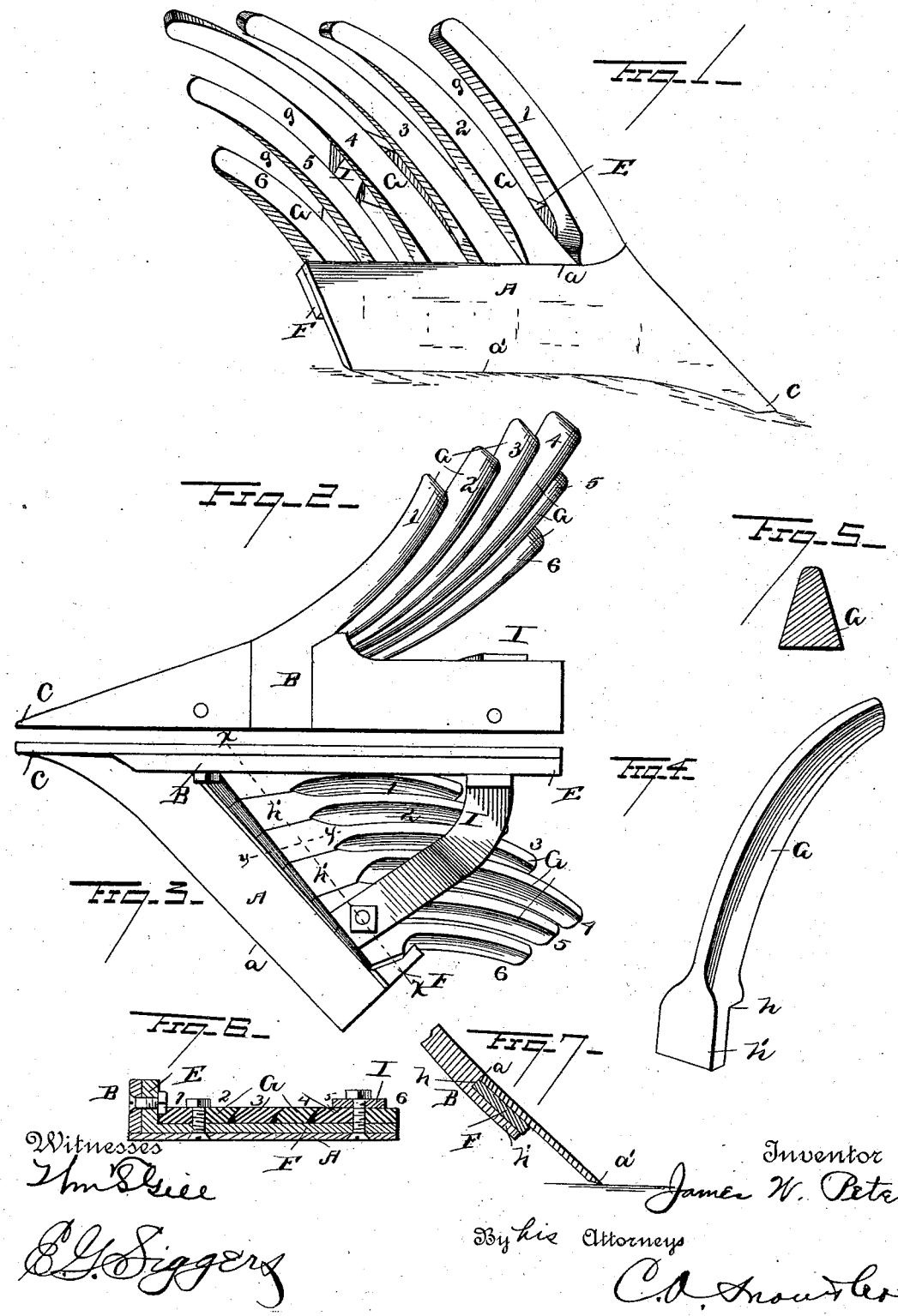

JAMES WILLIAM PETERS, OF JOHN ADAMS, CALIFORNIA.

MOLD-BOARD FOR PLOWS.

SPECIFICATION forming part of Letters Patent No. 349,404, dated September 21, 1886.

Application filed June 24, 1886. Serial No. 206,133. (No model.)

*To all whom it may concern:*

Be it known that I, JAMES WILLIAM PETERS, a citizen of the United States, residing at John Adams, in the county of Butte and State of California, have invented a new and useful Improvement in Mold-Boards for Plows, of which the following is a specification.

My invention relates to improvements in mold-boards for plows; and it consists of the peculiar combination and novel construction and arrangement of the parts for service, substantially as hereinafter fully set forth, and particularly pointed out in the claims.

The object of my invention is to provide an improved mold-board which is especially adapted for the cultivation or plowing of that class of soil known as "adobe" soil, which is to be found in the western and southwestern sections of this country, in plowing which it is desirable and important that the soil shall be thoroughly broken and pulverized before or at the time of its deposit or delivery from the mold-board.

The primary object of this invention is to provide a plow with a mold-board of peculiar construction, which shall effectively carry out the above desiderata, and at the same time be easy and light of draft, and simple and strong in construction, and cheap of manufacture.

In the accompanying drawings, which illustrate a mold-board embodying my invention, Figure 1 is a perspective view. Fig. 2 is an elevation, looking from the land side. Fig. 3 is a bottom plan view of the same. Figs. 4 and 5 are perspective and cross-sectional views, respectively, of one of the fingers of the mold-board. Fig. 6 is a horizontal transverse section on the line $x\, x$, Fig. 3. Fig. 7 is a detached vertical section on line $y\, y$, Fig. 3.

Referring to the drawings, in which like letters of reference denote corresponding parts in all the figures, A designates the mold-board, which is of the form more clearly shown in Fig. 1—that is to say, it has a straight upper edge, $a$, and a similar lower edge, $a'$, which is sharpened to form a cutting-edge to act upon the soil, and the end of the mold-board A toward the landside B of the plow is curved or inclined forwardly to provide the point C, which is tapered, as shown, so that it will readily and freely enter the soil.

B designates the landside of the plow, which is tapered at its front end to correspond with the inclination or angle of the point C, and the landside is provided with a bracing or strengthening plate, E, which lies in rear thereof and is concealed thereby, as shown in Fig. 3. The mold-board A is arranged in an inclined position with relation to the ground, as is usual, and it is also arranged at an angle or out of line with the landside of the plow to discharge the soil that falls thereon, and which is broken by the point C toward the broken land. The mold-board A is further provided with a brace or strengthening plate or strip, F, which is arranged on the rear or neutral surface thereof, and at its upper edge $a$.

G designates a series of fingers, which are arranged in a vertical position and out of contact with each other, so as to provide intermediate spaces, $g$, for the free passage therethrough of the soil after it has passed over the mold-board A. Each of the fingers G is curved longitudinally, and when all of the fingers are properly fitted to the mold-board their outer faces lie in line with each other, so as to present a smooth surface to the action of the soil. The fingers are provided at their lower ends with notches $h$, which form tongues $h'$, and the fingers are made tapering in cross-section, or V-shaped in form, the base of the V being at the front of the fingers, and forming the working-surface over which the soil or furrow-slice traverses, and the apex thereof being arranged in rear of the working-surface to form the neutral edges of the fingers. The fingers are thus provided with a broad working-surface, and they have inclined sides, which act upon the soil that passes through the fingers, to assist in breaking or separating the particles thereof very effectually before the soil is deposited. I have shown a series of six (6) fingers, which gradually increase in height or length as they extend from the land side of the plow toward the middle, or nearer to the opposite or delivery side of the plow, at which point the fingers are longest or highest, and the remaining fingers toward the side of the plow opposite to the landside are then gradually made shorter, so as to provide the delivery-point for the discharge of the soil therefrom. The fingers are numbered from one to six, inclusive; but I do not wish to be understood as confining myself to the use of any number of the fingers. The finger 1 at the land side of the plow is a little shorter than the finger 2 adjacent thereto, and the said finger 1 is bent forwardly so that its working-surface is in line with the similar surface of the finger 2, while the neutral surface thereof is out of line with the similar surface of the finger 2. The finger 3 is made a little longer than the finger 2, and the finger 4 is in like manner longer than the finger 3, while the fingers 5 and 6 are made shorter than the fingers 1 to 4, inclusive. When the fingers are properly adjusted to the mold-board A, of which they form a part, their longitudinal curvature tends or inclines toward the side of the plow opposite to the land side, and from which the furrow-slice or the soil is discharged; and the working-surface of the fingers approximates the similar surface of a mold-board of the ordinary form of plow—that is to say, it is curved in horizontal and vertical section, as shown. The degree of curvature of the arms increases from the arm 1 to the arm 4, and then decreases to the delivery side of the plow, the arm or finger 4 being bent and twisted so that it overhangs the arm 5. The tongues $h'$ of the fingers are secured on the brace-plate F of the mold-board, and the notched ends of the fingers bear or rest on the upper edges of the mold-board A, so that their working-surfaces are in line with the similar surface of the mold-board. The delivery end or side of the plow is braced by an arm, I, which is bolted to the landside at or near the rear end of the same, and to the brace-plate F of the mold-board at the free end thereof.

My improved mold-board as thus constructed is very durable, and simple in construction, and cheap of manufacture. By the spaces intermediate of the fingers or arms the furrow-slice is very throroughly broken before it is discharged from the mold-board, which is very essential for the class of work to which my improved plow is adapted, as heretofore described, although it can be used with equal advantage on other kinds of soil. The fingers are tapered longitudinally, and the widest or largest portions thereof are at the lower ends, where they join the mold-board, and the smallest or narrowest ends are at the upper extremities, thereby making or forming the slots $g$ of different or varying widths longitudinally, as shown.

Having thus fully described my invention, what I claim as new, and desire to secure by Letters Patent, is—

1. A mold-board for plows having a series of longitudinally-curved fingers arranged out of contact with each other to provide intermediate spaces, and having a wide working-surface and a thin neutral surface with the converging sides, the length of the fingers from the landside toward the middle of the mold-board being gradually increased, and then decreased from the middle toward the delivery side, substantially as described, for the purpose set forth.

2. The combination, with the mold-board having the longitudinal brace-plate on its neutral surface, of the independent fingers arranged out of contact with each other, and having the tongues at their lower ends bearing against and secured to the brace-plate of the mold-board, and with the notches resting upon the upper edges of the mold-board, the working-surfaces of the fingers being in line with the similar surface of the mold-board at the points where the fingers and mold-board are joined, substantially as described.

In testimony that I claim the foregoing as my own I have hereto affixed my signature in presence of two witnesses.

JAMES WILLIAM PETERS.

Witnesses:
A. H. CREW,
THOS. N. CREW.